United States Patent
Miller (10) Patent No.: US 11,736,517 B2
(45) Date of Patent: Aug. 22, 2023

(54) DATA STORAGE DEVICE WITH SECURITY MODULE

(71) Applicant: Seagate Technology LLC, Cupertino, CA (US)

(72) Inventor: Michael H. Miller, Eden Prairie, MN (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 352 days.

(21) Appl. No.: 16/786,368

(22) Filed: Feb. 10, 2020

(65) Prior Publication Data

US 2021/0250374 A1 Aug. 12, 2021

(51) Int. Cl.
| | |
|---|---|
| *H04L 9/32* | (2006.01) |
| *G06F 9/00* | (2006.01) |
| *H04L 9/40* | (2022.01) |
| *G06F 21/78* | (2013.01) |
| *H04L 9/08* | (2006.01) |
| *H04L 67/1097* | (2022.01) |

(52) U.S. Cl.
CPC .......... *H04L 63/1466* (2013.01); *G06F 21/78* (2013.01); *H04L 9/0869* (2013.01); *H04L 63/1416* (2013.01); *H04L 63/1433* (2013.01); *H04L 67/1097* (2013.01)

(58) Field of Classification Search
CPC ............... H04L 63/1466; H04L 9/0869; H04L 63/1416; H04L 63/1433; H04L 67/1097; G06F 21/78
USPC .......................................................... 726/2
See application file for complete search history.

(56) References Cited

U.S. PATENT DOCUMENTS

| | | | |
|---|---|---|---|
| 6,912,621 B2 | 6/2005 | Harris | |
| 7,707,638 B2 * | 4/2010 | Dellow | G06F 21/575 |
| | | | 713/188 |
| 8,104,088 B2 | 1/2012 | Khilnani et al. | |
| 8,789,202 B2 | 7/2014 | Touboul et al. | |
| 9,716,594 B2 | 7/2017 | Offenberg et al. | |
| 9,930,697 B2 | 3/2018 | Fan et al. | |
| 10,073,530 B2 | 9/2018 | Moshfeghi | |
| 10,402,577 B2 | 9/2019 | Knapp et al. | |
| 10,938,789 B2 | 3/2021 | Shadrin et al. | |

(Continued)

OTHER PUBLICATIONS

Non-Final Rejection for U.S. Appl. No. 16/801,830, dated Nov. 10, 2022, 7 pages.

(Continued)

*Primary Examiner* — Haresh N Patel
(74) *Attorney, Agent, or Firm* — Westman, Champlin & Koehler, P.A.

(57) ABSTRACT

A distributed data storage system can consist an attack module connected to distributed data storage system that has at least one host connected to a first data storage device and a second data storage device via a network controller. A susceptibility to a third-party attack in the distributed data storage system may be identified with the attack module, which prompts the generation of an attack counter strategy with the attack module. The attack counter strategy can have at least one proactive action directed at preventing a future third-party attack on the detected susceptibility that is executed prior to a third-party attack to temporarily randomize execution timing of a data access operation of the distributed data storage system.

20 Claims, 4 Drawing Sheets

(56) References Cited

U.S. PATENT DOCUMENTS

| | | | |
|---|---|---|---|
| 11,170,104 B1* | 11/2021 | Stickle | G06N 20/00 |
| 11,250,132 B2 | 2/2022 | Applebouma et al. | |
| 11,449,643 B2 | 9/2022 | Allo | |
| 2004/0250124 A1* | 12/2004 | Chesla | G06F 21/552 |
| | | | 709/224 |
| 2008/0301776 A1* | 12/2008 | Weatherford | H04L 63/18 |
| | | | 726/3 |
| 2009/0199288 A1 | 8/2009 | Buch et al. | |
| 2013/0275770 A1 | 10/2013 | Berger | |
| 2014/0020083 A1 | 1/2014 | Fetik | |
| 2015/0347760 A1* | 12/2015 | Kruglick | G06F 21/76 |
| | | | 726/25 |
| 2015/0350239 A1* | 12/2015 | Kruglick | G06F 21/556 |
| | | | 726/23 |
| 2016/0352509 A1* | 12/2016 | Wu | G09C 1/00 |
| 2017/0230179 A1 | 8/2017 | Mannan et al. | |
| 2018/0183855 A1 | 6/2018 | Sabella et al. | |
| 2018/0262526 A1* | 9/2018 | Jain | G09C 1/00 |
| 2018/0365635 A1 | 12/2018 | Lucrecio et al. | |
| 2018/0367314 A1 | 12/2018 | Egner et al. | |
| 2019/0215150 A1* | 7/2019 | Shefaat | H04L 9/0631 |
| 2019/0266359 A1* | 8/2019 | Li | H04L 9/003 |
| 2020/0120136 A1 | 4/2020 | Gadhe et al. | |
| 2020/0162251 A1 | 5/2020 | Wentz | |

OTHER PUBLICATIONS

U.S. Appl. No. 16/801,830, filed Feb. 26, 2020, entitled "Distributed Data Storage System With Backward Attestation", 24 pages.

Notice of Allowance and Fee(s) Due for U.S. Appl. No. 16/801,861, dated May 18, 2022, 13 pages.

Notice of Allowance and Fee(s) Due and Examiner Initiated Interview Summary for U.S. Appl. No. 16/801,830, dated Mar. 1, 2023, 13 pages.

* cited by examiner

DATA STORAGE DEVICE WITH SECURITY MODULE

SUMMARY

In accordance with some embodiments, an attack module is connected to distributed data storage system that has at least one host connected to a first data storage device and a second data storage device via a network controller. A susceptibility to a third-party attack in the distributed data storage system is identified with the attack module and prompts the generation of an attack counter strategy with the attack module. The attack counter strategy has at least one proactive action directed at preventing a future third-party attack on the detected susceptibility that is executed prior to a third-party attack to temporarily randomize execution timing of a data access operation of the distributed data storage system.

Other embodiments connect an attack module to distributed data storage system that has at least one host connected to a first data storage device and a second data storage device via a network controller. A susceptibility to a third-party attack in the distributed data storage system is identified with the attack module and prompts the generation of an attack counter strategy with the attack module. The attack counter strategy has at least one reactive action directed at mitigating an impact of the third-party attack on the detected susceptibility that is subsequently executed prior to a third-party attack to temporarily randomize execution timing of an operation of the distributed data storage system.

In various embodiments, an attack module is connected to distributed data storage system having at least one host connected to a first data storage device and a second data storage device via a network controller with the attack module configured to generate an attack counter strategy in response to a detected susceptibility to a third-party attack. The attack counter strategy has at least one proactive action directed at mitigating an impact of the third-party attack on the detected susceptibility by temporarily randomizing execution timing of a data access operation of the distributed data storage system.

These and other features which may characterize various embodiments can be understood in view of the following detailed discussion and the accompanying drawings.

BRIEF DESCRIPTION OF THE DRAWINGS

FIG. 6 shows an example timeline of events that can be carried out by a data storage device in accordance with some embodiments.

DETAILED DESCRIPTION

Various embodiments disclosed herein are generally directed to a data storage device employing intelligent security by altering data access operations based on detected and/or predicted threats.

The evolution of computing devices has provided users with greater data capacity, faster data access speeds, and greater processing capabilities than in the past. The introduction of fast data connections has further advanced the abilities of computing devices to provide robust practical advantages compared to stand-alone computing devices. However, increased computing device capabilities has allowed for greater risk to unwanted attacks by unauthorized parties. While security risks can be mitigated in a variety of manners, there exists a need to provide intelligent security risk mitigation to combat sophisticated attacks, and threats of attacks.

Accordingly, embodiments of a data storage device provide a security module that detects current and future security risks and takes reactive and/or proactive actions to mitigate those risks. The ability to assess security risks and generate one or more actions to reduce the chance of an attack allows a data storage device to operate reliably and efficiently. By evaluating security risks for a data storage device over time, a security module can evolve and adapt to changing data storage conditions and/or security threats with one or more actions that reduce, or eliminate, opportunities for third-party attacks.

Figure 1:
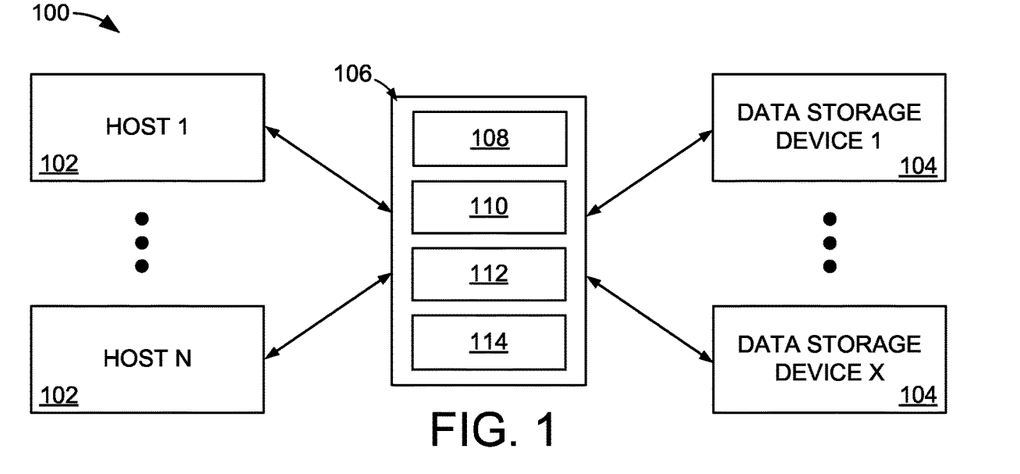
FIG. 1 provides a functional block representation of an example distributed data storage system in which various embodiments can be practiced.

While a data storage device employing a security module can be practiced in an unlimited variety of environments, various embodiments incorporate a data storage device into a distributed data storage system. FIG. 1 conveys a block representation of an example distributed data storage network 100 in which various embodiments can be practiced. The system 100 may have a number (N) of hosts 102 connected to a number (X) of data storage devices 104 via a network 106. The network 106 can provide wired and/or wireless signal pathways that allow for the distribution of at least data. It is contemplated, but not required, that the network 106 can connect one or more hosts 102 with network components, such as a node 108, server 110, processor 112, or control circuitry 114 that provides computing and/or data storage capabilities to the system 100.

The use of one or more network components in a data storage system can increase the efficiency and performance experienced by the assorted connected hosts 102. However, the flow of data, commands, firmware, and other system information through network components may introduce additional opportunities for unwanted attacks and/or data loss. The functional block representation of portions of an example distributed data storage system 120 in FIG. 2 convey how one or more unauthorized third-party accesses can jeopardize the security, reliability, and performance of data, data storage devices 104, and hosts 102. As shown, one or more hosts 102 can be connected to one or more data storage devices 104 via a network 106 that consists of at least one network component, such as a controller 122, that directing the flow of data between the host(s) 102 and the storage addresses of the device(s) 104.

Figure 2:
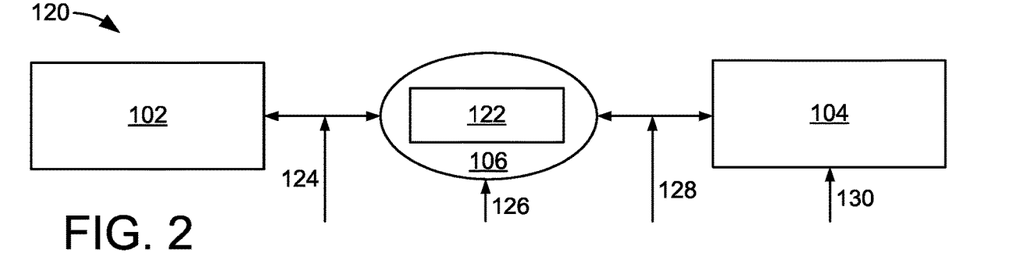
FIG. 2 diagrams aspects of an example distributed data storage system utilized in accordance with some embodiments.

As data is sent from a host 102 to be stored in the system 120, an attack, as represented by arrow 124, can copy, delete, or change the transferred data, which may contain sensitive content, such as encryption keys, security certificates, or firmware information. Once data arrives at a network controller 122, a third-party attack, as represented by arrow 126, can track, copy, and manipulate various commands, processing behavior, and data that can jeopardize the integrity of the controller 122 itself as well as the firmware operating through the controller 122. For instance, the third-party attack 126 may monitor power consumption, data signals, and/or command patterns to reverse engineer the actual data being transmitted, the metadata of data, the firmware being utilized, and/or the security credentials necessary to gain access to the firmware. In the latter case, detection of an infiltration by a third-party would be difficult as proper security credentials are presented when requested.

An attack downstream of the network controller 122, as represented by arrow 128, may also be used by a nefarious third-party to discover data, software, firmware, and security information. The receipt of data by a data storage device 104 can further provide an access point for an attack, as represented by arrow 130, that can gain information about the individual device 104 as well as system 120 information that can be used to control, alter, or otherwise manipulate the data, behavior, and security of some, or all, of the system 120. With so many different points in the flow of data between hosts 102 and data storage devices 104 that can potentially be vulnerable to side-channel and third-party attacks, the system 120 can be compromised in a diverse variety of manners, particularly with the sophistication of attackers and the volume of repetitive commands and information carried out by the system 120 during normal operation.

Figure 3:
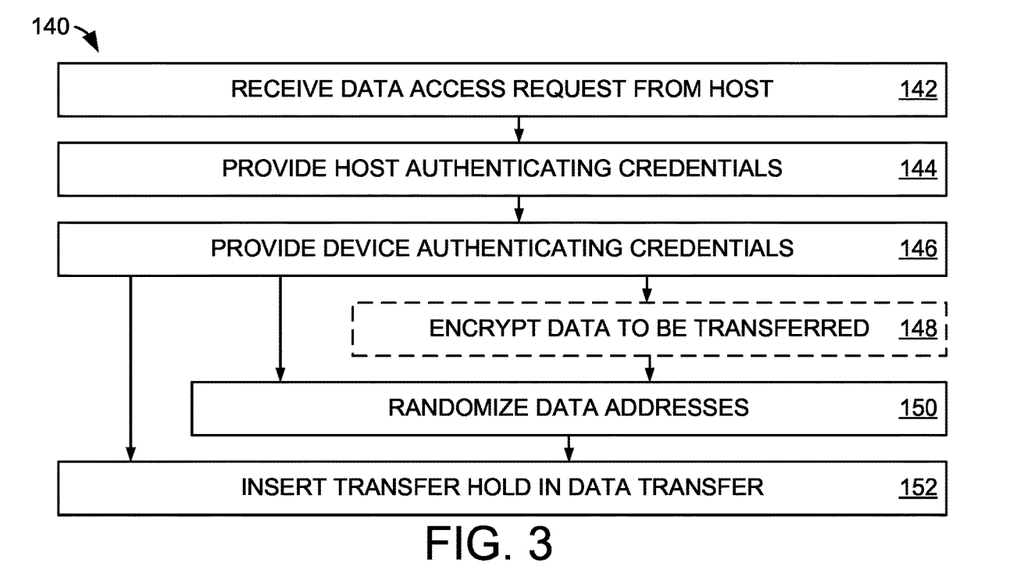
FIG. 3 displays an example timeline of events that can be practiced in the data storage system of FIGS. 1 & 2 in accordance with assorted embodiments.

FIG. 3 depicts a timeline of an example attack mitigation process 140 that can be carried out in accordance with some embodiments to prevent third-party attacks from gaining useful information, data, or otherwise compromising portions of a data storage system. It is noted that the attack mitigation process 140 can be characterized as two-way authentication where custody of data, metadata, firmware, and other system information is not transferred until the sending component and the receiving component have each been verified as genuine and authentic. As such, event 142 receives a data access request, such as a data read or write, from a host connected to a distributed data storage system.

Prior to be serviced by any component of the data storage system, the data access request, and requesting host, is authenticated in event 144 with the host providing one or more authenticating credentials. Event 146 responds with the receiving component, such as the network controller or a data storage device, providing authenticating credentials to the host, which prompts the actual transfer of data between the now authenticated components. It is contemplated that the data being transferred may be encrypted to further secure the data in addition to the authentication of the network components, as illustrated by segmented event 148.

It is further contemplated that additional data securing actions may be taken to prevent data and system information to be tracked and reverse engineered. For instance, data addresses may be randomized or otherwise manipulated in event 150. One or more data transfer holds may additionally, or alternatively, be inserted into the flow of data to a data storage device in event 152 to reduce the risk of pattern recognition by third-party attackers. While these various data pathway securing actions and events can generally reduce the risk of successful third-party attacks, the actions and events can correspond with large volumes of data processing, power consumption, and added data storage latency that degrade overall system performance. Hence, various embodiments monitor the operation of a distributed data storage system to determine when, and how, to carry out third-party attack mitigating behavior to provide a balance of system security with data and system security, integrity, and reliability.

Figure 4:
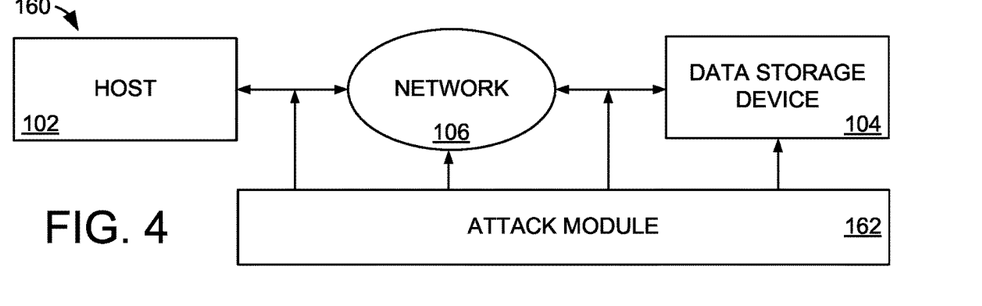
FIG. 4 illustrates a functional block representation of portions of an example distributed data storage system configured in accordance with various embodiments.

FIG. 4 depicts a block representation of portions of an example distributed data storage system 160 in which assorted embodiments may be practiced. By connecting one or more attack modules 162 to the various hosts 102, data storage devices 104, and components of the network 106, intelligent attack susceptibility and mitigation can be conducted. It is contemplated that an attack module 162 comprises circuitry configured to monitor current data storage conditions, behaviors, trends, patterns, and performance to detect present susceptibility to third-party attacks as well as predict future susceptibility to third-party attacks.

The ability to detect current attack threats and predict future susceptibilities of the data storage system 160 allows an attack module 162 to conduct reactive and/or proactive actions to mitigate the risk of attack and/or the severity of sensitive data and information that can be ascertained from an attack. That is, an attack module 162 can analyze multiple different attack mitigation strategies and select one or more actions that can increase the security of the data storage system 160 and/or reduce the risk of sensitive data, system information, and security credentials from being discovered during a third-party side channel or main channel attack.

Figure 5:
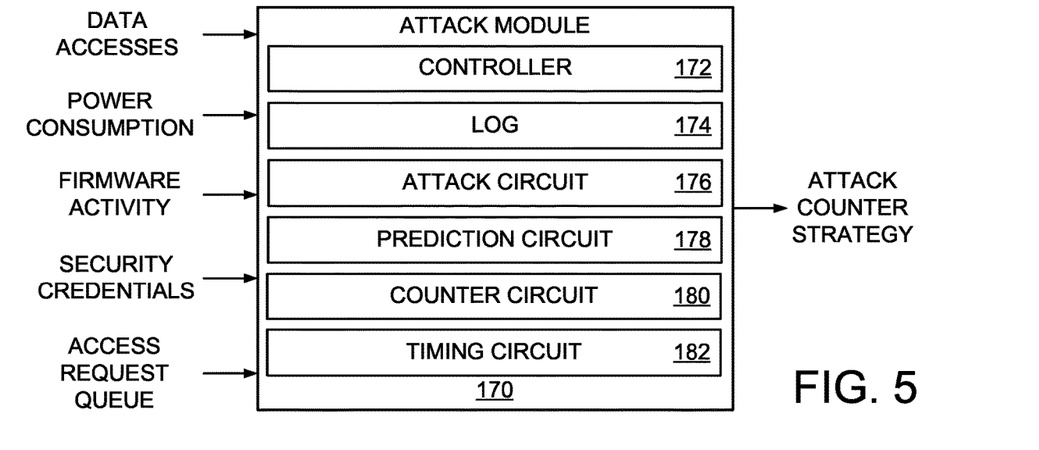
FIG. 5 depicts a block representation of an example attack module that can be employed by the data storage systems of FIGS. 1 & 2 in some embodiments.

FIG. 5 depicts a block representation of an example attack module 170 that can be employed in a data storage system of any size and with any number of hosts 102, network components, and data storage devices 104 in accordance with assorted embodiments. It is noted that an attack module 170 may be resident in any component of a data storage system or configured as stand-alone circuitry connected to one or more components or data pathways of a system. As such, the attack module 170 may have an independent local controller 172 that directs attack mitigation operations or may utilize the controller, or processor, of a component, such as a network controller or data storage device controller, to analyze current data storage conditions of a system and generate an attack mitigation strategy purposed to decrease the risk and/or severity of third-party attacks on the system.

The attack module controller 172 can detect and track one or more storage system conditions over time in a local log 174. For example, the controller 172 may sense and log at least power consumption, data access latency, data packet size, data physical addresses, and error rates to determine the real-time current data storage performance of individual components, such as a network controller, data storage device, or data pathway. The attack module controller 172 may further detect various data storage system configurations by monitoring normal data accesses or by executing a test pattern that may involve reading and/or writing a controller-generated test data block. The detection of system configurations can result in verification of a number of different operational aspects, such as firmware version, security credential age, type of security, type of data encryption, data management tables, pending data access requests, and volume of available data storage capacity.

With the detected data storage system configurations and current performance, the attack module 170 can ascertain current susceptibilities to third-party attacks with an attack circuit 176. That is, hardware of an attack circuit 176 can interpret current detected, and previously logged, system conditions, configurations, and performance to identify one or more system components and/or data pathways that are not operating with optimal security with respect to deterring, preventing, and/or mitigating the exposure of a third-party attack. The attack circuit 176 may solely rely on current system conditions, readings, and measurements to determine attack susceptibility. However, some embodiments utilize the prediction of one or more system actions, conditions, or performance alterations to determine attack susceptibilities. That is, the attack module 170 can react to attack susceptibilities identified from current and/or predicted system conditions and operations.

Regardless the manner in which attack susceptibilities are identified, a counter circuit 180 of the attack module can generate one or more counter attack strategies that are directed to prevent attacks, reduce the risk of attacks, and/or mitigate the damage liability of an attack. The counter circuit 180 may, in some embodiments, utilize the prediction circuit 178 to test how one or more potential counter strategies may prevent or mitigate an attack or how a counter strategy may impact the data access performance of the system. The ability to effectively test different attack mitigation counter strategies ensures a counter strategy can be efficiently implemented with a balance of attack risk protection to data access performance degradation during the actions prescribed by the counter strategy.

While not required or limiting, a counter strategy can have any number of reactive and/or proactive actions, thresholds, and operational alterations that change the current data storage system configuration to prevent/mitigate third-party attacks. As a non-limiting example, a counter strategy may assign a reactive action of increasing the verification credentials of a network controller identity prior to data transfer in combination of a proactive action of altering the data access timing of data from the network controller prior to an attack being identified or considered imminent. It is contemplated that any number and type of reactive and proactive system configuration changes can be prescribed by a counter strategy and executed by local, and upstream network, controllers at the earliest convenience of the controllers or at prescribed times, such as prior to a data write, access from a network controller, or a firmware version update.

Various embodiments of a counter strategy implement one or more timing instances into system operation to prevent/mitigate third-party attacks. A timing circuit 182 can be utilized by the counter circuit 180 to determine the most effective timing controls to provide optimal attack prevention/mitigation without degrading the data access performance of the data storage system. That is, the timing circuit 182 can provide the counter circuit 180 with one or more timing delays, accelerations, and/or randomizations that prevent and/or mitigate third-party attacks by reducing detected and/or predicted attack susceptibilities without decreasing data access performance, which makes the timing controls transparent to the connected hosts of a distributed data storage system.

Figure 6:
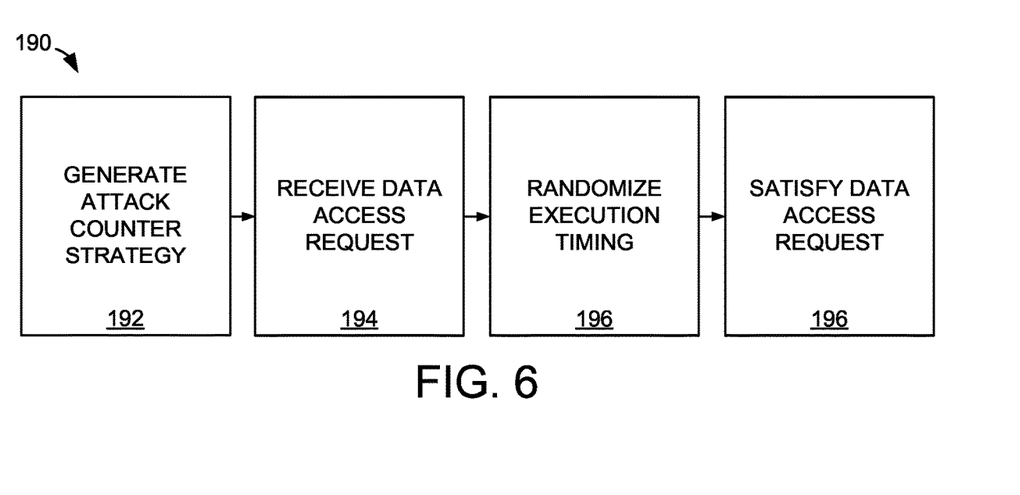
FIG. 6 shows an example timeline of events that can be executed by a data storage device in accordance with assorted embodiments.

The attack module 170 may be employed to implement one or more attack counter strategies at prescribed times or in response to encountered events. The non-limiting examples of FIGS. 6-10 generally convey how the attack module 170 can be utilized to generate attack counter strategies that combat the threat of third-party attacks by decreasing actual and predicted attack susceptibilities with reactive and/or proactive actions. FIG. 6 depicts an example timeline 190 in which an attack module 170 has created an attack counter strategy in accordance with some embodiments. It is contemplated that the attack module 170 has identified an attack susceptibility in a downstream data storage device, or upstream network component, such as a network controller, server, or switch, and generated an attack counter strategy in step 192 that prescribes an increase in authentication security via the incorporation of a timing event calculated by the timing circuit 182 of the attack module 170.

At some time after the generation of the counter attack strategy in step 192, a data access request is received from a host in step 194 that initiates the formation of a data pathway between an upstream network component and a downstream data storage device. During authentication of the identity of the network component, the data storage device, or both, step 196 inserts one or more timing instances that alter a default authentication sequence execution. That is, step 196 can insert a time delay, acceleration, or combination thereof to effectively randomize the timing of authentication of the network component, data storage device, or both. The insertion of timing instances may be conducted during the delivery and/or evaluation of authentication keys or certificates in order to prevent the tracking and reverse engineering of the key/certificate during a third-party attack.

It is contemplated that the insertion of time instances in step 196 can be conducted to provide a net delay, acceleration, or balance with a default authentication sequence. For instance, the aggregate total of time delays inserted into an authentication sequence can equal the aggregate total of time accelerations inserted into the authentication sequence to provide a net balance and equal total execution time with the default authentication sequence. As another non-limiting example, a net delay in total authentication sequence execution time for a first device/component authentication may be balanced by a net acceleration in total authentication sequence execution time for a second device/component authentication. The ability to alter and effectively randomize the timing of key/certificate delivery and/or authentication can heighten the reliability and security of device/component authentications over time by preventing the recreation of the key/certificate and authentication sequence by a third-party monitoring power consumption and/or data signal processing.

With the increased component/device authentication security, step 198 proceeds to carry out the data access request to store data to the data storage device or retrieve data from the authenticated data storage device. The use of heightened component/device authentication via timing instances is an example of proactive actions that can be employed to protect the integrity of the key/certificates as well as the authentication sequence itself. However, the insertion of timing instances is not limited to the proactive protection of authentication sequences.

Figure 7:
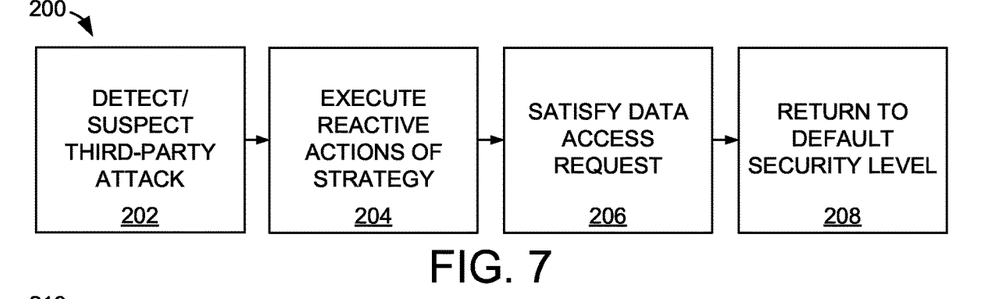
FIG. 7 shows an example timeline of events that can be executed by a data storage device in accordance with various embodiments.

FIG. 7 depicts an example timeline 200 in which an attack module 170 has created an attack counter strategy in accordance with various embodiments in response to a detected, or predicted attack susceptibility. Initially, a third-party attack is detected or suspected in step 202 with one or more attack indicators, such as unusually high network traffic, unsuccessful component/device authentications, or long connectivity of a remote network node. The attack indicator prompts step 204 to reactively execute portions of the attack counter strategy to increase the security of data being transferred within the distributed data storage system for a prescribed amount of time.

Step 204 may involve one or more timing instances that temporarily sacrifice system performance for heightened data security. As a non-limiting example, data access requests, data delivery, data verification, and data maintenance can be intentionally delayed, or accelerated, to effectively randomize servicing a data access request or performing data maintenance, such as data deduplication, garbage collection, parity creation, mirroring, and data mapping. The reactive nature of data access request timing modification is not required as timing instances can be utilized proactively to add security to data, data pathways, system components, and data storage devices individually and collectively.

The ability to prioritize data security over data access performance, such as device initialization, system startup times, or data read or write latency, allows a distributed data storage system to strategically prevent, or at least mitigate the sensitivity of information that can be tracked and reverse engineered from, a third-party attack. The increased security, however, does not stop the flow of data to service a first data access request in step 206, which can be followed by the return of the system to a default security level where default data access timing is employed to service a second data access request in step 208.

Figure 8:
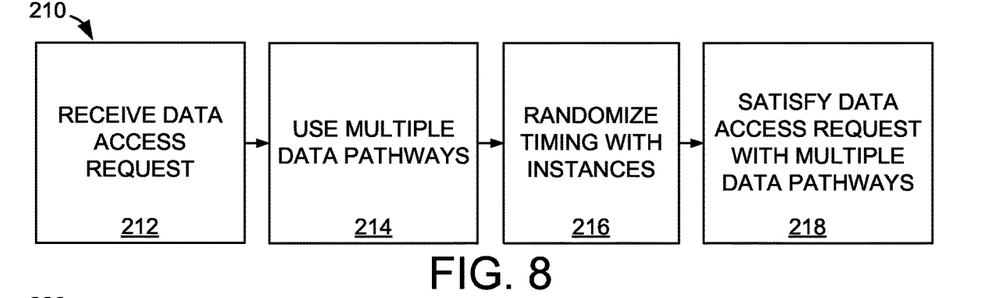

FIG. 8 depicts an example timeline 210 in which an attack module 170 has created an attack counter strategy in accordance with various embodiments in response to a detected, or predicted attack susceptibility. In response to a data access request received in step 212, the attack counter strategy can prescribe the distribution of data and/or system component authentication credentials across multiple different data pathways in step 214. By utilizing multiple difference data channels, step 214 can effectively randomize the timing of data requests, component authorization, device initialization, and data transfers.

It is contemplated, but not required, that the attack counter strategy further introduces one or more timing instances in step 216 into at least one data pathway to ensure randomization of data and security information delivery and/or processing. Regardless of whether additional timing instances are used to delay, or accelerate, the transfer, processing, or delivery of data and/or authentication information, step 218 can concurrently employ multiple different data pathways to service the data access request. Such concurrent use of data channels can correspond with data, or authentication information, being divided into sub-packets prior to step 218 concurrently sending the sub-packets with common, or deliberately different, timings to confuse and randomize a default servicing of a data access request with a single data pathway/channel.

Figure 9:
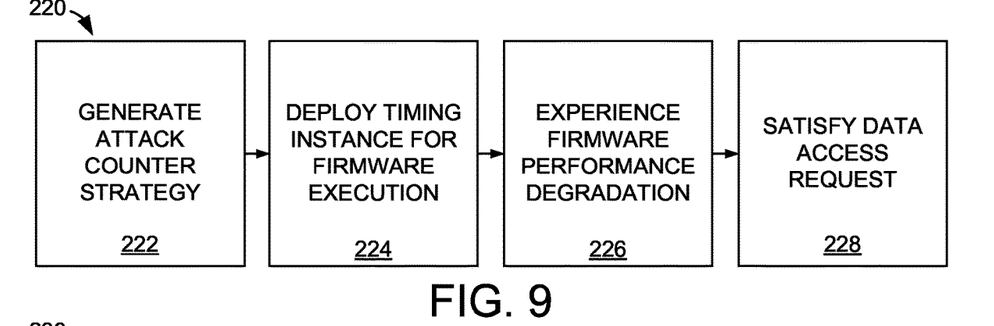
FIG. 9 shows an example timeline of events that can be executed by an example data storage device in accordance with assorted embodiments.

In some embodiments, timing instances can be utilized as part of an attack counter strategy to protect more than just data, system components, and data storage devices. FIG. 9 depicts an example timeline 220 that employs an attack counter strategy generated by an attack module 170 in accordance with various embodiments in response to a detected, or predicted attack firmware susceptibility. To increase the protection and security of firmware for some, or all, of a distributed data storage system, an attack counter strategy can prescribe the proactive, or reactive, timing instances for the polling, updating, and utilization of firmware commands.

As such, step 222 can generate an attack counter strategy focused on increasing the security of firmware that is implemented in step 224 by deploying at least one timing instance that delays, or accelerates, the activity of firmware. For instance, step 224 can delay the accessing of firmware, the authentication of firmware, the processing of data access commands with firmware, and/or updating of firmware versions. The implementation of one or more timing instances for firmware activity effectively randomizes default firmware timing for various activities, such as servicing data access requests, component/device initialization, authentication of data, data pathways, and system components/devices, and modifications to data, metadata, or the firmware itself.

Through the randomization of default firmware operating timing, the firmware may experience performance degradation for data accesses, startup initialization, or system security operations in step 226. However, it is contemplated that firmware timing instances may temporarily increase firmware performance as accesses, updates, refreshes, and/or updates execute with modulated timing compared to a default firmware operating timing. The intelligent modulation of firmware execution timing can provide immutable timing control that prevents avoidance by any third-party attackers during the servicing of data access requests in step 228, which optimizes firmware security specifically in regard to detected, or predicted, attack susceptibility.

Figure 10:
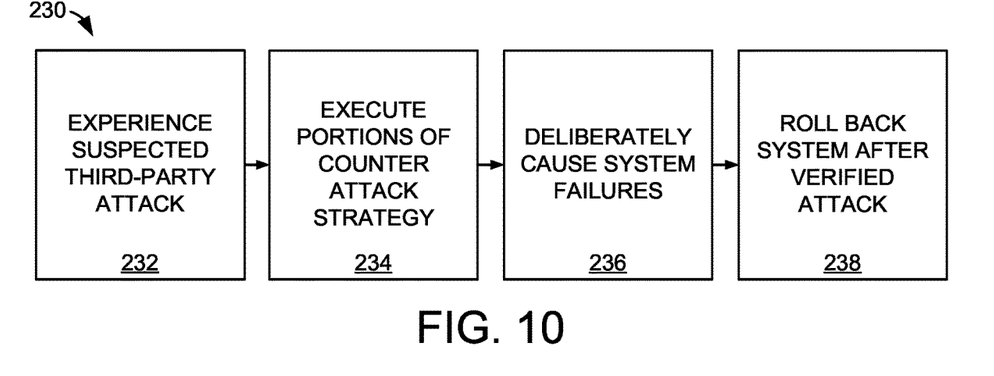
FIG. 10 shows an example timeline of events that can be executed by an example data storage device in accordance with various embodiments.

FIG. 10 depicts an example timeline 230 that can deploy an attack counter strategy generated by an attack module 170 in accordance with various embodiments in response to a detected, or predicted attack susceptibility. Step 232 can experience a suspected third-party attack from one or more detected system activities, such as firmware polling occurrences, long node connectivity, or high number of incorrect security credentials. It is contemplated that one or more reactive timing instances can be inserted into data, metadata, authentication, and firmware operations to modulate and randomize a default system timing, as generally discussed in the timeline 200 of FIG. 7.

The suspicion of an attempted, or successful, third-party attack on a distributed data storage system can prompt step 234 to execute portions of an attack counter strategy aimed at verifying the attack. For example, one or more timing modulations can be reactively inserted into system operation to identify if one or more system conditions or operating parameters have been changed by the attack. The use of timing modulation in such an instance can deliberately cause system failures in step 236 that recognize altered system conditions/parameters and allow the attack counter strategy to roll back the system in step 238 to a point in time where the assorted system conditions were known to be authentic and genuine.

The reactive verification of an attack and/or the system changes inflicted by an attack allows a distributed data storage system to mitigate the damage and/or impact of an attack on the integrity, security, and reliability of data, metadata, firmware, system components, and data storage devices. By utilizing timing modulations to bait, imitate, and otherwise weed out system alterations from an unwanted third-party system infiltration, attacks can be quickly isolated due to command, data, and firmware accesses, processing, and/or delivery timing modulation. The use of data access timing modulation can be particularly effective in weeding out past successful third-party attacks by comparing the component, device, firmware, or metadata reaction to the modulated timing compared to a known authentic reaction.

It can be appreciated from the examples of FIGS. 6-10 that the generation and execution of an attack counter strategy can provide reactive or proactive randomization of system activities to increase the security of the system, the reliability of data, and integrity of system firmware. The generation of an attack counter strategy in view of detected, or predicted, system susceptibilities further ensures the effectiveness of timing modulations with minimal performance impact on the system as a whole. The identification of current, or future, attack susceptibilities based on actual system performance, conditions, behaviors provides intelligent attack prevention or attack impact mitigation that allows a distributed data storage system to operate over time with optimal security balanced with data storage performance.

Figure 11:
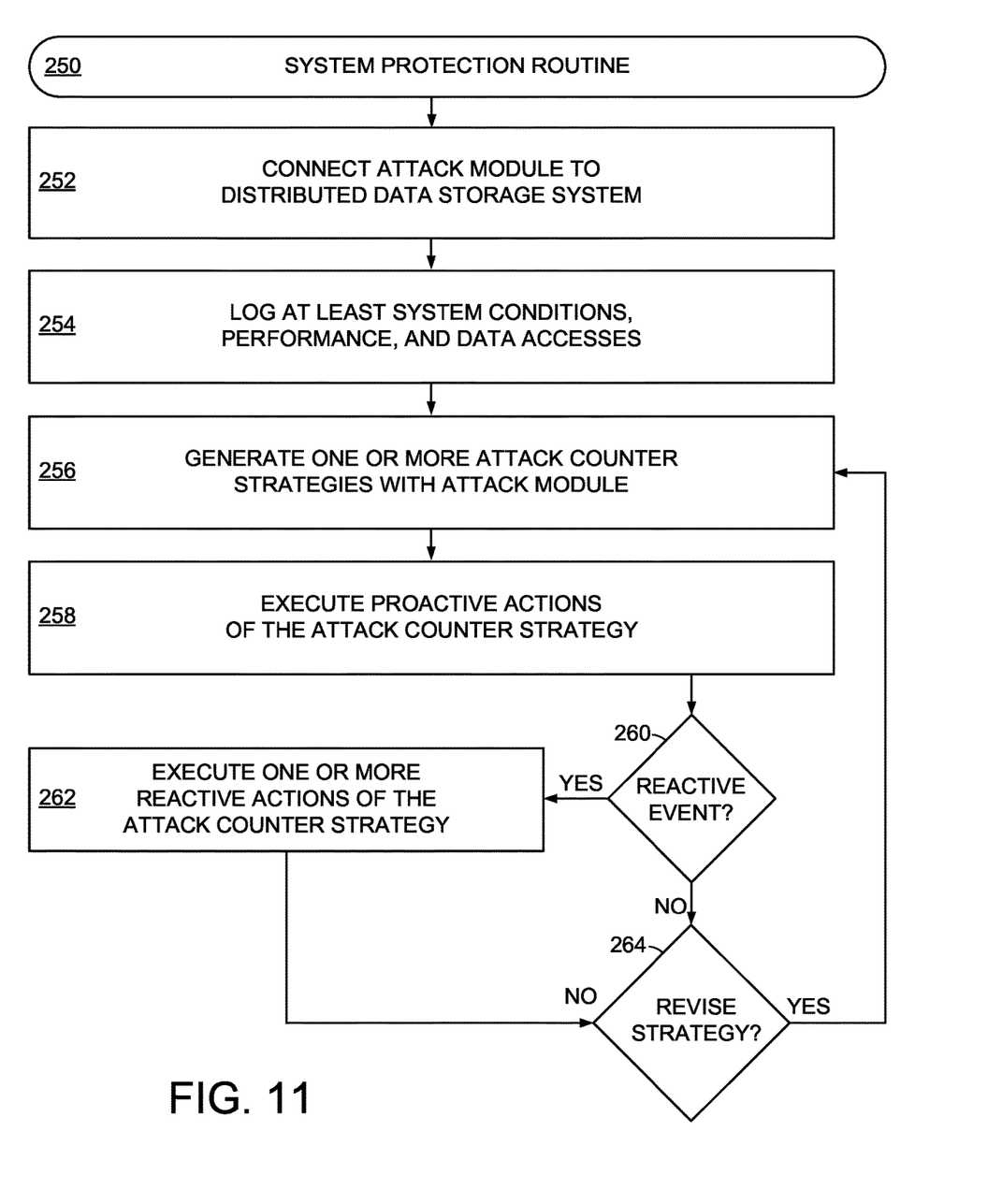
FIG. 11 is an example system utilization routine that can be carried out with the respective embodiments of FIGS. 1-10.

FIG. 11 depicts an example system protection routine 250 that can be carried out by a distributed data storage system in accordance with various embodiments to provide optimized system security over time. An attack module is connected to a distributed data storage system in step 252 and begins to log one or more system conditions and data access information in step 254. It is noted that one or more attack modules can be configured as hardware of a data storage device, or network component, or can be a stand-alone circuitry that is connected to a device/component or data pathway. The logging of system conditions, performance, and information in step 254 may track a static, or dynamic, list of activities from normal data access operations from one or more hosts or from test patterns initiated by the attack module.

The logged list of system activities, conditions, and performance can then be utilized to generate one or more attack counter strategies in step 256 that prescribe one or more actions that proactively or reactively alter the operation of at least one network component, data storage device, and/or firmware to reduce the risk of a third-party attack and/or mitigate the impact of an attack on data and system integrity for a detected or predicted attack susceptibility. It is contemplated that separate reactive and proactive attack counter strategies can be generated in step 256 from system and data metrics logged in step 254, tested, and/or predicted from prediction circuitry of the attack module. Such separate reactive and proactive attack counter strategies can be implemented at different times or a single attack counter strategy can have different execution times for reactive and proactive actions.

Regardless of how many attack counter strategies are generated, step 258 executes the proactive actions of the strategies to reduce the risk and/or impact of an attack on a detected or predicted system susceptibility. For instance, timing modulation can be implemented proactively in step 258 prior to a third-party attack by implementing one or more timing delays, or accelerations, into firmware operations, data accesses, data pathway authentications, and/or security credential verifications. The execution of timing modulation in step 258 can proactively randomize the timing of data access operations, system initializations, and system updates for a prescribed amount of time identified by the attack module as an attack susceptibility. That is, the insertion of timing instances to effectively randomize system timing comes at the expense of increased processing and system complexity and is not expected to remain in effect beyond a time identified as a susceptibility to a third-party attack, which allows the system to provide optimized data access performance when not particularly susceptible to attacks.

With proactive actions executed, decision 260 proceeds to evaluate system operation and conditions to determine if a reactive action triggering event is detected or imminent. The presence of a triggering event predetermined from an attack counter strategy prompts step 262 to execute one or more reactive actions prescribed by the attack counter strategy to prevent or mitigate the impact of an attack. At any time after the execution of proactive actions in step 258, decision 264 can evaluate if an attack counter strategy is not optimal and is in need of revision, or replacement. Decision 264 is not limited to a particular set of criteria to determine if an attack counter strategy is ideal, or not, but can utilize recent system conditions, performance, data sensitivity, attempted attacks, and successful attacks to determine if actual and predicted system attack susceptibilities are optimally addressed by the current attack counter strategies.

If the current attack counter strategies are determined to be sub-optimal, the routine 250 returns to step 256 where one or more new strategies are generated and implemented. A cyclic return to step 256 may incorporate new, or different, system information that has been detected, or predicted by the attack module since the current attack counter strategy was generated. Such ability to continually track and log system operations and performance to provide attack counter strategies optimized for the prevention, or mitigation, of third-party attacks on current system susceptibilities ensures the intelligent and efficient use of randomized timing modulations with minimal degradation of data access performance by the assorted components and data storage devices of the system.

What is claimed is:

1. A method comprising:
    connecting an attack module to distributed data storage system, the distributed data storage system comprising at least one host connected to a first data storage device and a second data storage device via a network controller;
    identifying a susceptibility to a future third-party attack in the distributed data storage system with the attack module;
    identifying, with the attack module, a time range for the susceptibility to the future third-party attack;
    generating an attack counter strategy with the attack module in response to the identified susceptibility, the attack counter strategy comprising at least one proactive action directed at preventing a future third-party attack during the identified susceptibility time range; and
    executing the at least one proactive action of the attack counter strategy prior to a third-party attack and during the identified susceptibility time range.

2. The method of claim 1, wherein the susceptibility to the future third-party attack is identified in response to prediction of a future distributed data storage system condition by a prediction circuit of the attack module.

3. The method of claim 1, wherein the susceptibility to the future third-party attack is identified in response to a current distributed data storage system condition detected by the attack module.

4. The method of claim 1, wherein the attack counter strategy comprises at least one reactive action directed at randomizing execution timing of one or more data access operations in response to a triggering event prescribed by the attack module.

5. The method of claim 4, wherein the randomization of execution timing consists of inserting at least one delay in satisfying a data access request by the at least one host.

6. The method of claim 4, wherein the randomization of execution timing consists of inserting at least one acceleration in satisfying a data access request by the at least one host.

7. The method of claim 4, wherein the randomization of execution timing consists of inserting at least one delay and at least one acceleration in satisfying a data access request by the at least one host, the at least one delay and at least one acceleration providing a balanced, net zero execution time for satisfying the data access request.

8. The method of claim 1, wherein the at least one proactive action divides a data access request into packets that are transferred via separate data channels of the distributed data storage system, the respective packets transferred with different timing selected by a timing circuit of the attack module.

9. The method of claim 8, wherein the packets are transferred concurrently via the separate data channels with matching timing.

10. The method of claim 8, wherein the packets are transferred concurrently via the separate data channels with the different timings.

11. A method comprising:
connecting an attack module to distributed data storage system, the distributed data storage system comprising at least one host connected to a first data storage device and a second data storage device via a network controller;
identifying a susceptibility to a third-party attack in the distributed data storage system with the attack module;
identifying, with the attack module, a time range for the susceptibility to the future third-party attack;
generating an attack counter strategy with the attack module in response to the identified susceptibility, the attack counter strategy comprising at least one reactive action directed at mitigating an impact of the third-party attack on the distributed data storage system during the identified time range; and
executing the at least one reactive action of the attack counter strategy prior to a third-party attack in response to a triggering event detected by the attack module, the at least one reactive action executed during the identified time range for susceptibility to induce a failure to recognize an altered condition in the distributed data storage system.

12. The method of claim 11, wherein the at least one reactive action randomizes timing of an authentication of the first data storage device.

13. The method of claim 11, wherein the at least one reactive action randomizes timing of a security certificate verification.

14. The method of claim 11, wherein the at least one reactive action randomizes timing of firmware version authentication.

15. The method of claim 11, wherein the at least one reactive action randomizes timing of firmware operation.

16. The method of claim 11, wherein the at least one reactive action randomizes timing of a data access operation to verify a suspected third-party attack.

17. An apparatus comprising:
an attack module connected to a distributed data storage system, the distributed data storage system comprising at least one host connected to a first data storage device and a second data storage device via a network controller, the attack module comprising circuitry configured to:
identify a susceptibility to a future third-party attack in the distributed data storage system;
identify a time range for the susceptibility to the future third-party attack;
generate an attack counter strategy in response to the identified susceptibility, the attack counter strategy comprising at least one proactive action directed at preventing a future third-party attack during the identified susceptibility time range; and
execute the at least one proactive action of the attack counter strategy prior to a third-party attack and during the identified susceptibility time range.

18. The apparatus of claim 17, wherein the attack module is configured to identify the susceptibility to the future third-party attack in response to prediction of a future distributed data storage system condition by a prediction circuit.

19. The apparatus of claim 17, wherein the attack module is configured to identify the susceptibility to the future third-party attack in response to a current distributed data storage system condition.

20. The apparatus of claim 17, wherein the attack counter strategy comprises at least one reactive action directed at randomizing execution timing of one or more data access operations in response to a triggering event prescribed by the attack module.

* * * * *